United States Patent
Yamashita

(10) Patent No.: US 8,094,225 B2
(45) Date of Patent: Jan. 10, 2012

(54) SOLID-STATE IMAGING APPARATUS

(75) Inventor: Yuichiro Yamashita, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 340 days.

(21) Appl. No.: 12/546,871

(22) Filed: Aug. 25, 2009

(65) Prior Publication Data

US 2010/0053398 A1    Mar. 4, 2010

(30) Foreign Application Priority Data

Aug. 29, 2008 (JP) ................................. 2008-222022

(51) Int. Cl.
*H04N 5/335* (2006.01)

(52) U.S. Cl. ......... 348/302; 348/294; 348/296; 257/291

(58) Field of Classification Search ................ None
See application file for complete search history.

(56) References Cited

U.S. PATENT DOCUMENTS

| | | | | |
|---|---|---|---|---|
| 6,069,376 A | * | 5/2000 | Merrill | 257/291 |
| 6,812,539 B1 | | 11/2004 | Rhodes | 257/435 |
| 7,623,056 B2 | | 11/2009 | Yamashita | 341/163 |
| 7,633,539 B2 | | 12/2009 | Yamashita | 348/294 |
| 2003/0209744 A1 | * | 11/2003 | Futamura | 257/294 |
| 2004/0222481 A1 | | 11/2004 | Rhodes | 257/435 |
| 2006/0170009 A1 | * | 8/2006 | Kitano et al. | 257/236 |
| 2008/0036890 A1 | | 2/2008 | Yamashita et al. | 348/308 |
| 2009/0244328 A1 | | 10/2009 | Yamashita | 348/241 |
| 2009/0256176 A1 | | 10/2009 | Kobayashi et al. | 257/225 |
| 2009/0284632 A1 | | 11/2009 | Onuki et al. | 348/302 |

FOREIGN PATENT DOCUMENTS

| | | |
|---|---|---|
| JP | 2006-523034 A | 10/2006 |
| JP | 2007-157912 A | 6/2007 |

\* cited by examiner

*Primary Examiner* — David Ometz
*Assistant Examiner* — Angel L Garces-Rivera
(74) *Attorney, Agent, or Firm* — Fitzpatrick, Cella, Harper & Scinto

(57) ABSTRACT

A solid-state imaging apparatus includes a plurality of pixels, with each of the pixels including a photoelectric conversion unit, a charge accumulating unit, an amplifying unit, and a transfer electrode. The apparatus further includes a light shielding portion covering the charge accumulating unit, and a connecting unit for electrically connecting the control electrode and the light shielding portion, and wherein the light shielding portion of a pixel in one row is electrically connected to the other light shielding portions of other pixels in the same one row and adjacent to the pixel in the one row, and is electrically insulated from other light shielding portions of pixels in rows different from the one row.

4 Claims, 8 Drawing Sheets

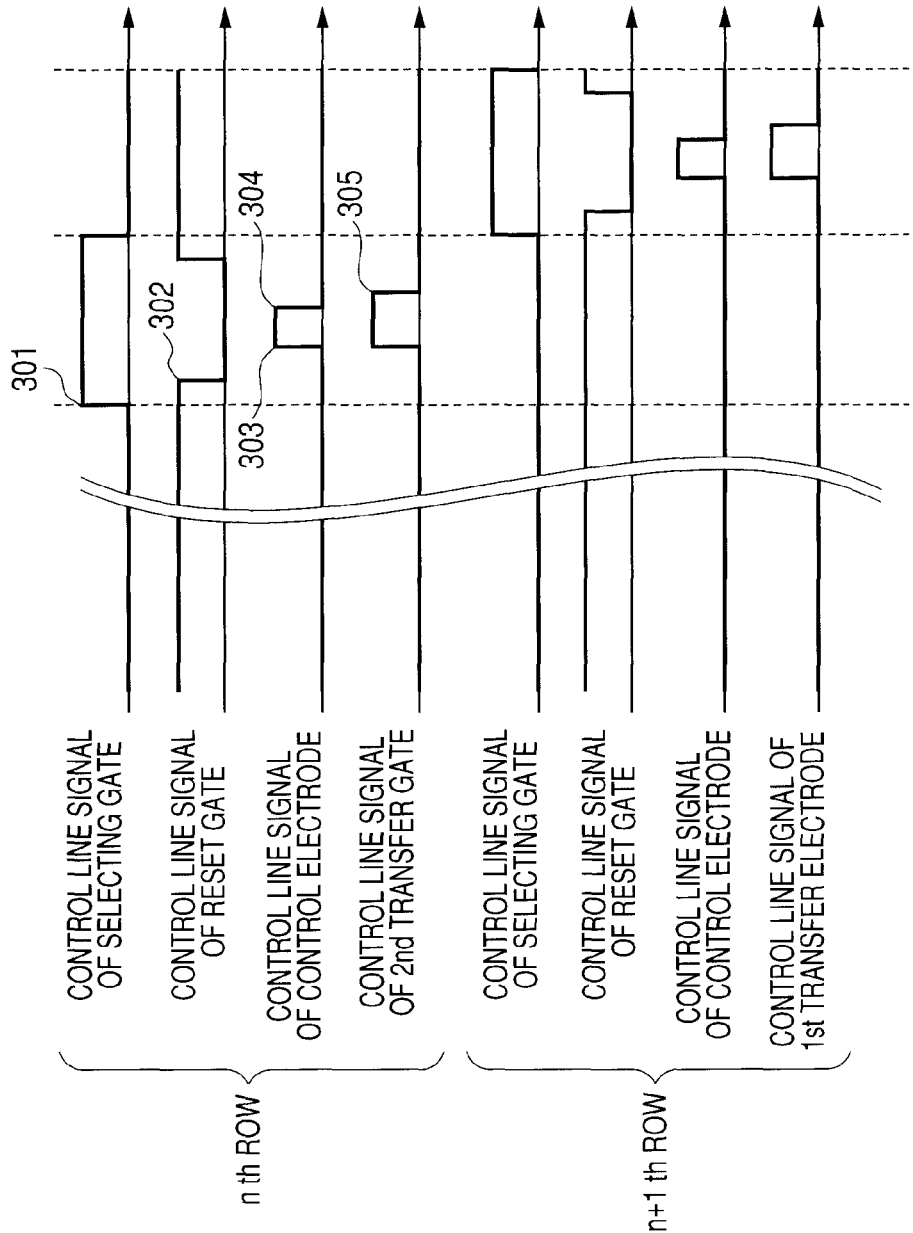

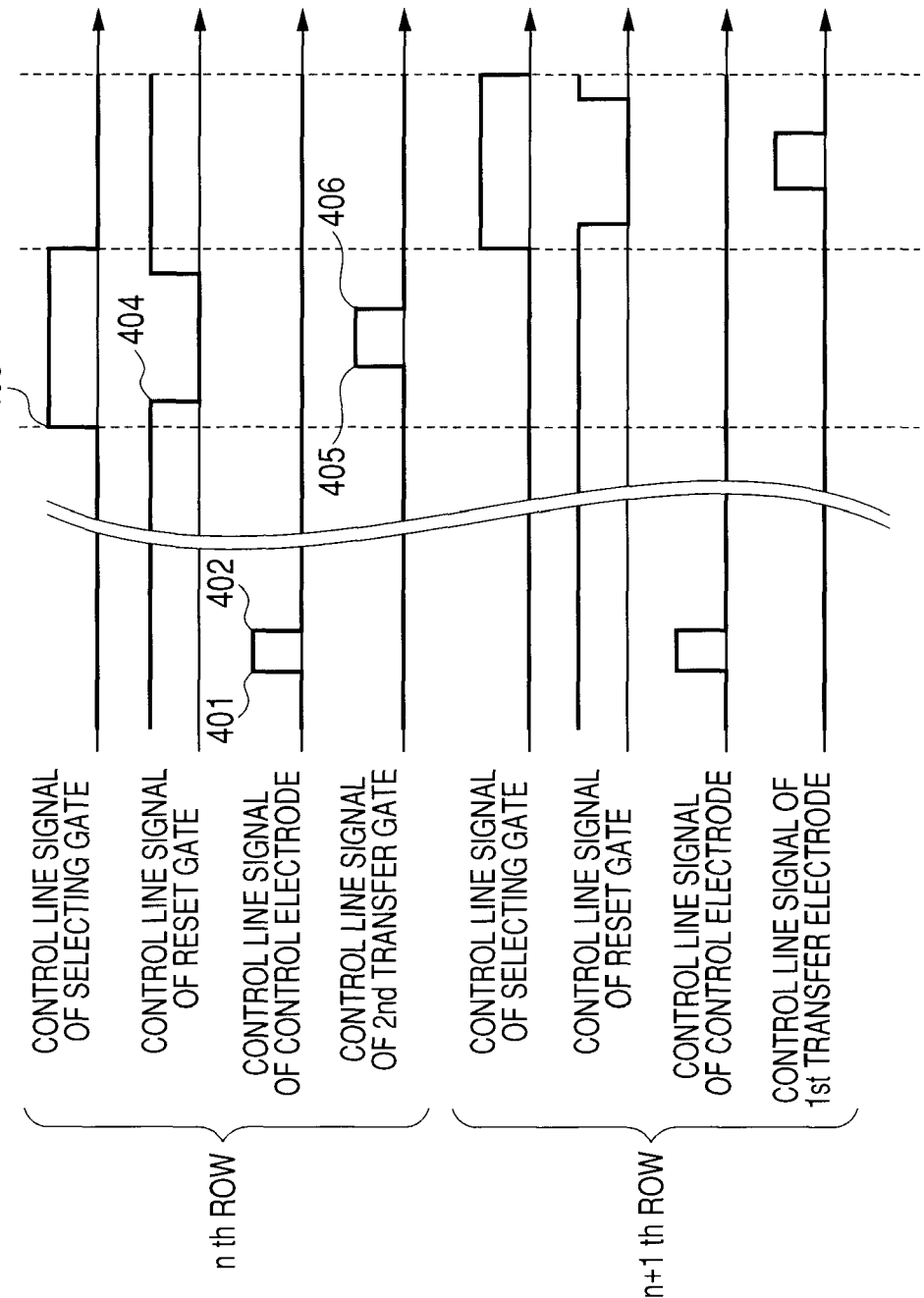

SOLID-STATE IMAGING APPARATUS

BACKGROUND OF THE INVENTION

1. Field of the Invention

The present invention relates to a solid-state imaging apparatus with pixels arranged along rows and columns, each pixel including a photoelectric conversion element.

2. Description of the Related Art

It has been known that an MOS amplifying type solid-state imaging apparatus such as a CMOS sensor performs a global electronic shutter operation. In a global electronic shutter operation, all the pixels arranged along rows and columns simultaneously start and finish their respective photoelectric charge accumulation.

For a global electronic shutter operation, it is necessary to provide a charge accumulating unit that accumulates charges generated as a result of photoelectric conversion for a predetermined period of time in each pixel.

In general, a common signal line is provided for each pixel column, and thus, the charge accumulating unit assumes the role of accumulating changes from the end of pixel accumulation until the start of reading for a certain relevant pixel. Accordingly, if light enters the charge accumulating units while charges are being accumulated in the charge accumulating units, resulting in generation of charges by means of photoelectric conversion, such charges become noise, which may deteriorate the image quality.

In order to solve the problem, National Publication of International Patent Application No. 2006-523034 describes a light shield having a light shielding function being provided in each pixel. These light shields are fixed to a common ground potential. Each light shield includes an aperture for introducing light to a photo diode and an aperture for connecting an electrode arranged below the light shielding and a wiring.

Also, Japanese Patent Application Laid-Open No. 2007-157912 employs the technique of providing a space around each charge accumulating unit, and connecting the gaps and a light shielding layer provided above the charge accumulating units, thereby protecting the accumulation units by means of the total reflection by the gaps and the light shielding layer.

A CMOS sensor requires the drive control of transistors in each pixel, and thus, requires an electric connection structure, such as a plug, from the wiring layer to the substrate via a light shielding portion. In such a technique as disclosed in National Publication of International Patent Application No. 2006-523034, which is based on the notion that all the components of each pixel, other than a photo diode, are covered, and thus, a light shielding film is provided with an aperture in a position in which the substrate and the wiring layer are electrically connected.

However, when an aperture is provided in a light shielding portion, light may leak under the light shielding portion as a result of, e.g., the light directly passing through the aperture or propagating while being diffracted. For obtainment of an effect equivalent to light shielding by means of a physical mechanical shutter, the strict characteristic of a light shielding effect of no less than one hundred thousand to one, that is, only one part of light leaks into a charge accumulating unit per one hundred thousand parts of light entering the pixel may be required. However, where a light shielding portion is provided with an aperture, such effect cannot be expected.

Also, in Japanese Patent Application Laid-Open No. 2007-157912, all the incoming light is not always subject to total reflection, and light not satisfying the conditions for a critical angle may not be blocked, resulting in entering the charge accumulating units.

Furthermore, National Publication of International Patent Application No. 2006-523034 and Japanese Patent Application Laid-Open No. 2007-157912 both contemplate only the case where the accumulation units are simultaneously driven for the entire imaging area. Thus, they do not deal with an operation particular to CMOS sensors, called "line exposure operation".

The present invention has been made in view of the above problems, and aims to provide a configuration enabling a line exposure operation while preventing lowering of the light shielding effect for the charge accumulating units.

SUMMARY OF THE INVENTION

In view of the above problems, the present invention provides a solid-state imaging apparatus comprising: a plurality of pixels arranged along rows and columns on a substrate, wherein each of the pixels includes a photoelectric conversion unit, a semiconductor region, a control electrode disposed to sandwich an insulating film between the control electrode and the semiconductor region, a charge accumulating unit for accumulating in the semiconductor region signal charges generated in the photoelectric conversion unit, an amplifying unit, and a transfer unit having a transfer electrode for controlling an electrical continuity between the charge accumulating unit and an input portion of the amplifying unit, wherein the solid-state imaging apparatus comprises a light shielding portion covering the charge accumulating unit, and a connecting unit for connecting electrically the control electrode to the light shielding portion, the light shielding portion of the pixel in one row is electrically connected to the other light shielding portions of the other pixels in the same row and adjacent to the pixel in the one row, and is electrically insulated from other light shielding portions of pixels in rows different from the one row.

Further features of the present invention will become apparent from the following description of exemplary embodiments with reference to the attached drawings.

BRIEF DESCRIPTION OF THE DRAWINGS

FIG. 4 illustrates an example of timing in line exposure mode.

FIG. 5 illustrates an example of timing in global exposure mode.

The accompanying drawings, which are incorporated in and constitute a part of the specification, illustrate embodiments of the invention and, together with the description, serve to explain the principles of the invention.

DESCRIPTION OF THE EMBODIMENTS

Figure 1:
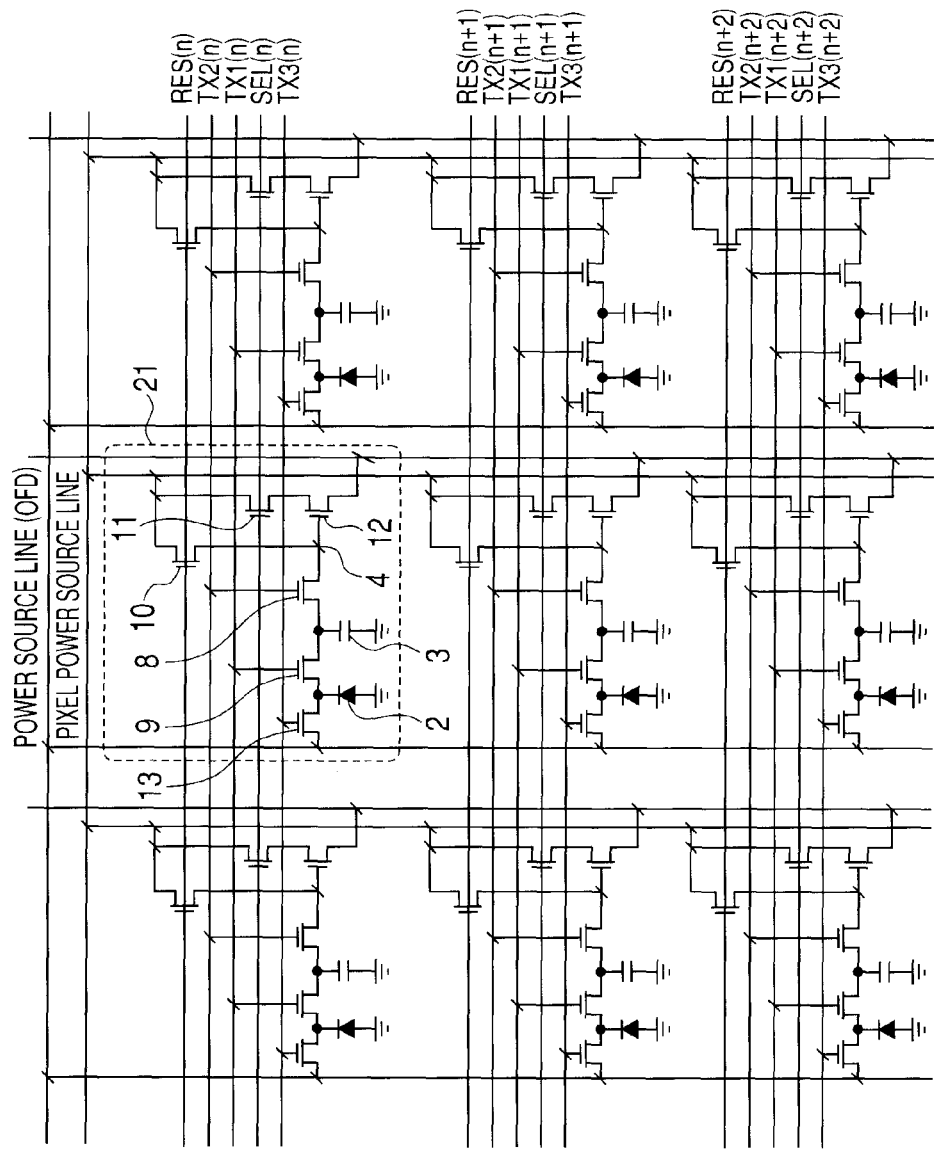
FIG. 1 is an equivalent circuit for a solid-state imaging apparatus.

FIG. 1 is an equivalent circuit for pixels included in a solid-state imaging apparatus according to the present invention. For simplicity of description, a region of nine pixels in total, which has three rows and three columns, is illustrated as an example of pixels included in the imaging region. However, the number of pixels is not limited to this example.

A charge accumulating unit 3 is configured to accumulate signal charges generated in a photoelectric conversion unit 2. A first transfer unit 8 transfers the charges in the charge accumulating unit to an input portion of the amplifying unit 4. The input portion of the amplifying unit may include a control electrode for an amplifying transistor and a floating diffusion region electrically connected to the control electrode. A second transfer unit 9, which is provided as necessary, transfers the charges in the photoelectric conversion unit to the charge accumulating unit. A reset unit 10 supplies a reference voltage to at least the input portion of the amplifying unit. Furthermore, the reset unit 10 may supply the reference voltage also to the charge accumulating unit. A selection unit 11, which is provided as necessary, outputs signals based on the signal charges generated in the photoelectric conversion unit to a signal line for the pixel row including the relevant pixel. An amplifying unit 12 forms a source follower circuit together with a constant current source provided in the signal line. A charge discharging control unit 13 controls the electrical connection between the photoelectric conversion unit and a power source line, which serves as an overflow drain (hereinafter, "OFD") region.

The configuration in FIG. 1 can be applied in common to the following embodiments. Also, the equivalent circuit is not limited to this example, and some components of the configuration, such as the floating diffusion region, the amplifying unit and/or the reset unit, may be shared by a plurality of pixels.

First Embodiment

Figure 2:
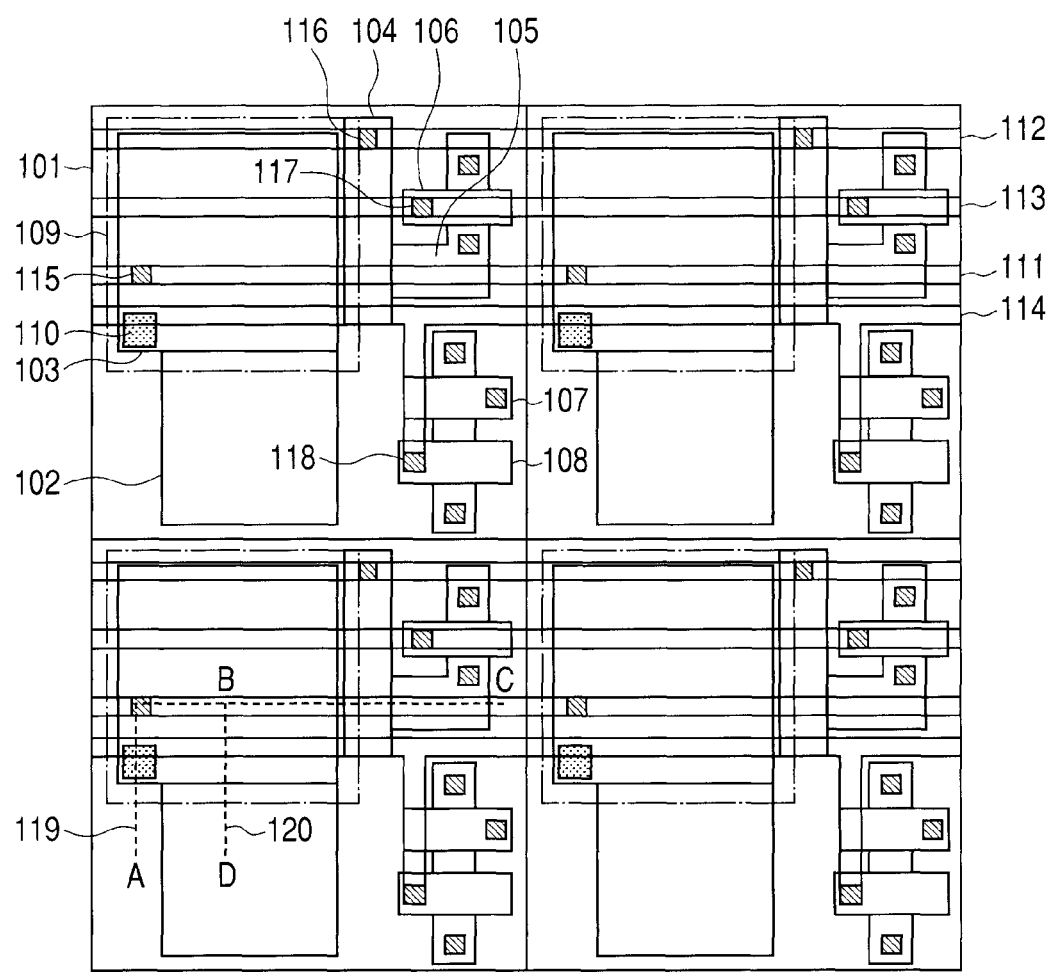
FIG. 2 is a top view of pixels in a solid-state imaging apparatus according to a first embodiment.

FIG. 2 is a top view of pixel layout according to a first embodiment. Pixels and amplifying units are arranged along rows and columns on a substrate. In FIG. 2, an amplifying unit is provided in each pixel.

A unit pixel region 101 is illustrated in a rectangle. A photo diode 102 serves as a photoelectric conversion unit. A control electrode 103 is provided on a semiconductor region that can accumulate signal charges generated in the photo diode, via an insulating film. This control electrode forms a part of the charge accumulating unit that can hold signal charges.

A first transfer electrode 104 is included in a first transfer unit. A floating diffusion region (FD region) 105 forms a part of an input portion of the amplifying unit. A gate electrode 106 for a reset MOS transistor is included in a reset unit. A gate electrode 107 for an amplifying MOS transistor is included in an amplifying unit. A gate electrode 108 for a selection MOS transistor is included in a selection unit.

A light shielding portion 109 is arranged so as to cover at least the upper surface of the control electrode 103. The light shielding portion can cover the entire charge accumulating unit, but a certain light shielding effect can also be provided by means of covering the upper surface and a part of the side surfaces of the control electrode 103. For the material for the light shielding portion, a substance exhibiting conductive properties and a high light shielding effect, such as tungsten, tungsten silicide or another alloy, can be used. A contact plug 115 is provided to electrically connect the control electrode and the light shielding portion. Alternately, such connection may be provided by successively filling a through hole with a metal forming the light shielding portion. However, hereinafter, description will be provided assuming that the control electrode is connected to the light shielding portion via the contact plug.

A wiring layer is provided on the light shielding portion via an interlayer insulation film. The wiring layer includes a first control line 111 for controlling the voltage supply to the control electrode 103 and a second control line 112 for control the conductivity of the first transfer unit. Furthermore, the wiring layer includes a third control line 113 for controlling the conductivity of the reset MOS transistor, and a fourth control line 114 for controlling the conductivity of the selection unit. These four wirings are arranged in parallel to the pixel row.

A contact plug 110 is provided for electrically connecting the first control line and the light shielding portion, and contact plugs 116, 117 and 118 are provided for connecting the remaining control lines and the respective gate electrodes.

A pixel also includes, e.g., a wiring for supplying a reference voltage to the reset unit, a column output line for outputting signals from the pixels included in the same pixel column, and a wiring for connecting the FD region and the gate electrode for the amplifying MOS transistor. However, such components are not illustrated in the figure because illustration of such components results in complexity of the figure and is not necessary for description of the present embodiment.

Figure 3A:
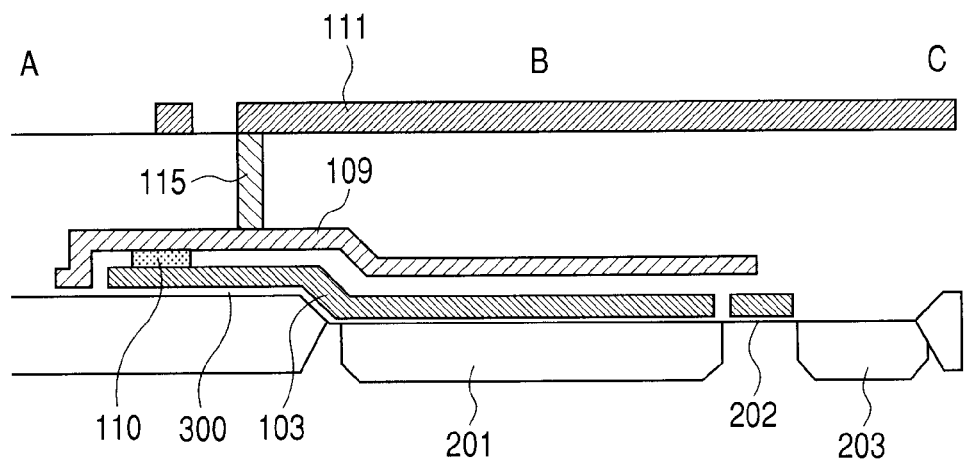
FIGS. 3A and 3B are cross-sectional views of a pixel in a solid-state imaging apparatus according to a first embodiment.
Figure 3B:
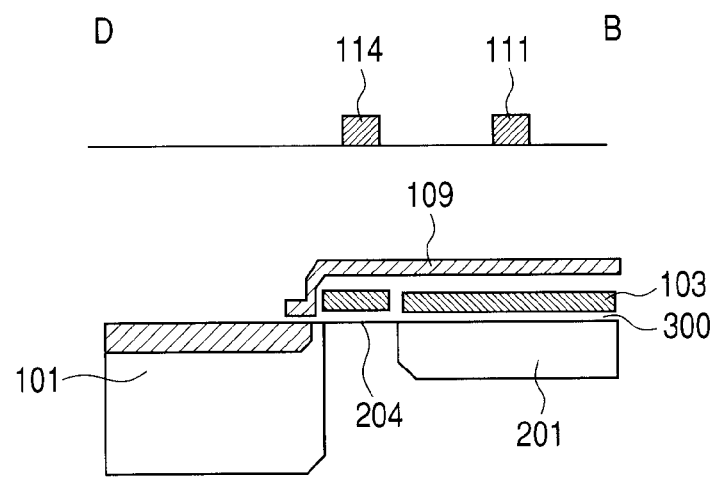

FIGS. 3A and 3B are cross-sectional views taken along dotted line 119 indicated by A-B-C in FIG. 2 and dotted line 120 indicated by D-B. Here, description will be provided taking the case where electrons are used as signal charges, for an example. In case that hole is used as a signal charge, it is only necessary to reverse conductivity type of each of the semiconductor regions.

In FIG. 3A, an N-type semiconductor region 201 is arranged in a P-type well. The N-type semiconductor region 201 can accumulate electrons generated by the photoelectric conversion unit. The N-type semiconductor region forms a charge accumulating unit with the aforementioned control electrode. A transfer electrode 202 is included in a first transfer unit. Also, a control electrode 103 is provided on the semiconductor region 201 via an insulating film 300. Furthermore, the control electrode 103 is electrically connected to a first control line 111, which is a wiring, via a contact plug 110, which serves as a first connecting unit, a light shielding portion 109, and a contact plug 115, which serves as a second connecting unit. In other words, the light shielding portions of adjacent pixels included in the same pixel row are electrically connected in unit of a pixel row, and are electrically insulated from the light shielding portions of pixels included in another pixel row. Such configuration allows a voltage supplied from the control lines to be supplied to the control electrodes via the light shielding portions for the respective pixel rows.

FIG. 3B is a diagram illustrating the details of a portion below the control electrode of the charge accumulating unit. A second transfer unit 204 is provided to control the conductivity of an electrical path between a buried photo diode 101, which is included in the photoelectric conversion unit, and a charge accumulating unit in order to transfer electrons generated in the buried photo diode 101 to the N-type semiconductor region 201 included in the charge accumulating unit. Upon a positive voltage being supplied to the control electrode 103, electrons are transferred from the photo diode 101 to the N-type semiconductor region 201. The signal charges transferred to the N-type semiconductor region 201 are accumulated, and then the electrons are transferred to the FD region 203 upon a positive voltage being supplied to the transfer electrode 202 of the first transfer unit.

Here, the control electrode 103 has an integrated structure so as to perform the control of the conductivity of an electrical path between the photoelectric conversion unit and the charge accumulating unit, as well as the control of the charge accumulating unit, an electrode dedicated to a second transfer unit may separately be provided.

Also, the first control line 111 is electrically connected to the control electrode 103 via the light shielding portion 109. Use of a conductive material as the material for the light shielding portion enables the voltage supply to the control electrode in the charge accumulating unit to be performed via the first control line.

Next, an exposure operation of a solid-state imaging apparatus with unit pixels arranged along rows and columns will briefly be described. Here, two types of operations, global exposure in which the pixels in all the rows take an image with the same exposure start and end times, and line exposure in which the pixels in respective pixel rows perform exposure at times slightly different from one another, will be described. In other words, global exposure is a driving mode in which the start and end of an operation to accumulate charges in pixels are set in common to the entire imaging area, and line exposure is a driving mode in which the start and end of an operation to accumulate charges in the pixels are set in common to each row of pixels. There modes can be switched from each other via a control signal from a control circuit (not illustrated) to the solid-state imaging apparatus.

The aforementioned "global exposure" corresponds to what is called "global electronic shutter function".

FIG. 4 illustrates control pulses supplied to a first control line (for the control electrodes in the charge accumulating units), a second control line (for the first transfer units), a third control line (for the reset units) and a fourth control line (for the selection units) during a line exposure operation. Here, only control that is in common to the pixel row is extracted, and the control performed subsequent to output of the signals to the column output line is not illustrated because it is not necessary for the description.

In line exposure mode, signal charges are transferred from the photoelectric conversion units to the floating diffusion regions via the charge accumulating units for each pixel row. The control for the n-th row is performed as described below.

At a time 301, the selection units in the n-th row are made to enter a conductive state, thereby selecting the n-th row. Here, the reset units in the n-th row are in a conductive state, and have reset the potential by supplying a reference voltage to the FD regions.

At a time 302, the reset state of the FD regions is cancelled, and at a time 303, the control electrodes in the charge accumulating units and the transfer electrodes in the first transfer units are made to enter a conductive state by supplying a high voltage to the control electrodes and the transfer electrodes, thereby reading electrons out to the FD regions from the photo diodes via the charge accumulating units. At a time 304, the control electrodes in the charge accumulating units and the transfer electrodes in the first transfer units are made to enter a non-conductive state in this order at a time 304 and a time 305, respectively, by supplying a low voltage to the control electrodes and the transfer electrodes. After the end of the processing for the n-th row, the same operation is performed in a similar manner for the next n+1-th row. Unless a mechanical light shielding unit (external mechanical shutter) is used, the n-th row is subjected to light exposure (accumulation) till the time 304 at which the voltage supplied to the control electrodes in the charge accumulating unit is made to be low, and accumulation is performed at different times for the respective lines, which is the reason why this operation is called "line exposure".

FIG. 5 illustrates control pulses supplied to the first to fourth control lines during a global exposure operation. As in the case illustrated in FIG. 4, the control performed subsequent to output of signals to the column output line is not illustrated because it is not necessary for the description.

In global exposure mode, before performing the control of each pixel row, the transfer of electrons from the photoelectric conversion units to the charge accumulating units is simultaneously started at a time 401 for all the pixel rows, and at the time 402, the transfer to the charge accumulating units is finished. Next, after selecting a certain pixel row at a time 403, the reset state of the FD region is cancelled at a time 404, and at a time 405, a high voltage is supplied to the transfer electrode in the first transfer unit so as to enter a conductive state, thereby electrons are transferred from the charge accumulating unit to the FD region. Subsequently, at a time 406, the voltage supplied to the first transfer electrode is lowered, thereby the first transfer electrode entering a non-conductive state. After the end of the processing for the n-th row, the same operation is performed in a similar manner for the n+1-th row.

The transfer of electrons from the photoelectric conversion unit to the charge accumulating unit is finished at the time 402 for all the pixels, the exposure can be finished at a common end time for the entire screen, which is the reason why such operation is called "global exposure", enabling an image of an object moving at a high speed to be taken without distortion.

According to the present embodiment, both a line exposure operation and a global exposure operation can be provided with a light shielding effect kept high, without providing apertures, which are provided for forming contact plugs for connecting the charge accumulating units and the control lines, to the light shielding portions arranged above the charge accumulating units. While light leakage is suppressed by covering the control electrodes in the charge accumulating units at a low position, separate light shielding portions are provided for the respective pixels, and a wiring arranged in the row direction and the respective separate light shielding portions are connected, enabling provision of both a line exposure operation and a global exposure operation while the light shielding effect is being enhanced.

Here, although the light shielding portion does not cover the MOS transistors included in, e.g., the reset unit, the amplifying unit and the selection unit in each pixel, the light shielding portion may cover such units. Since the light shielding portions are arranged in a position relatively close to the surface, although it is necessary to take a parasitic capacity into account, the light shielding effect may further be enhanced by, for example, covering the drain electrodes of the MOS transistors included in the reset units to the possible extent.

Second Embodiment

Figure 6:
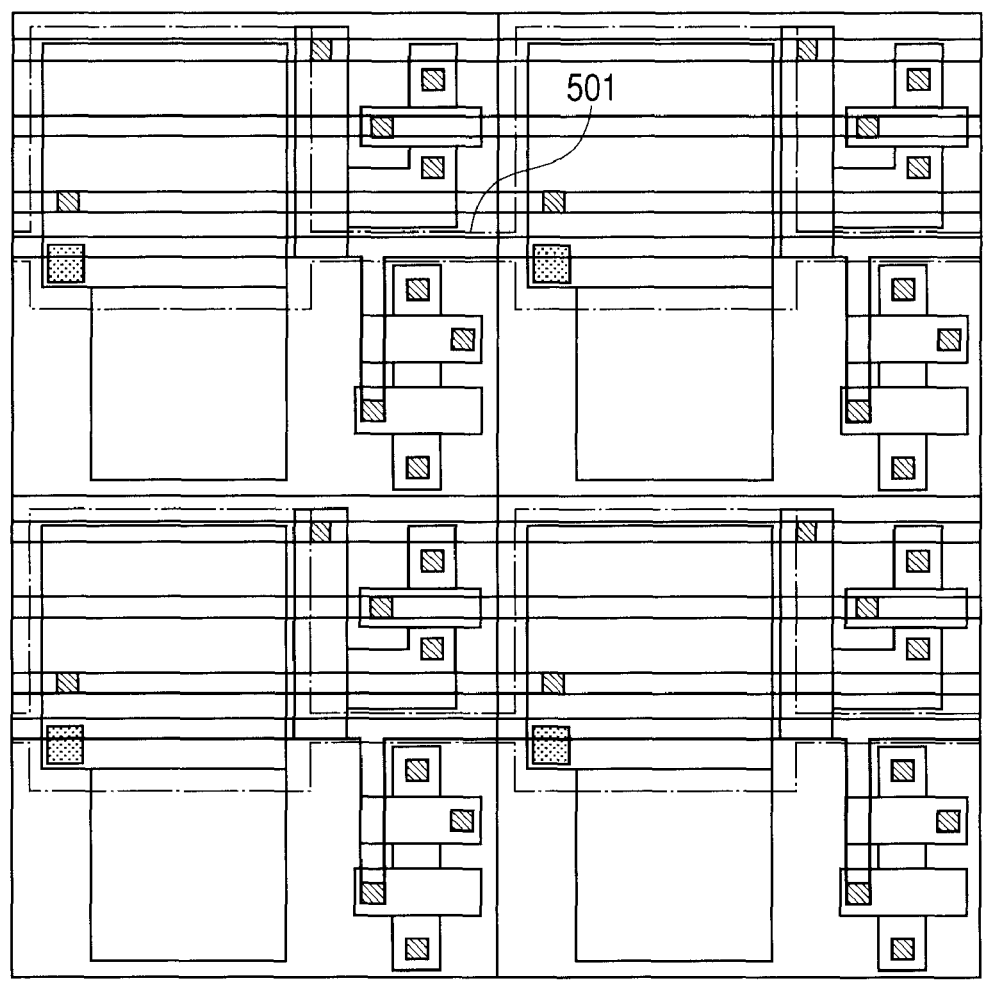
FIG. 6 is a top view of pixels in a solid-state imaging apparatus according to a second embodiment.

FIG. 6 is a top view of a solid-state imaging apparatus according to a second embodiment. The second embodiment is different from the first embodiment in that the light shielding portions of adjacent pixels in the same pixel row are directly connected to one another. In this case, each light shielding portion is arranged not in an active region in which, e.g., an FD region and the source and drain regions of transistors are formed, but in a field region, which is an element isolation region including, e.g., an oxide film.

According to the present embodiment, in order to electrically connect the light shielding portions in the same pixel row with one another, the light shielding portions are directly connected to one another without a wiring arranged among them, and thus, it is not necessary separately to provide a wiring for electrically connecting the light shielding portions. As a result, the area used for the wirings is reduced, enabling further downsizing of pixels.

Third Embodiment

Figure 7:
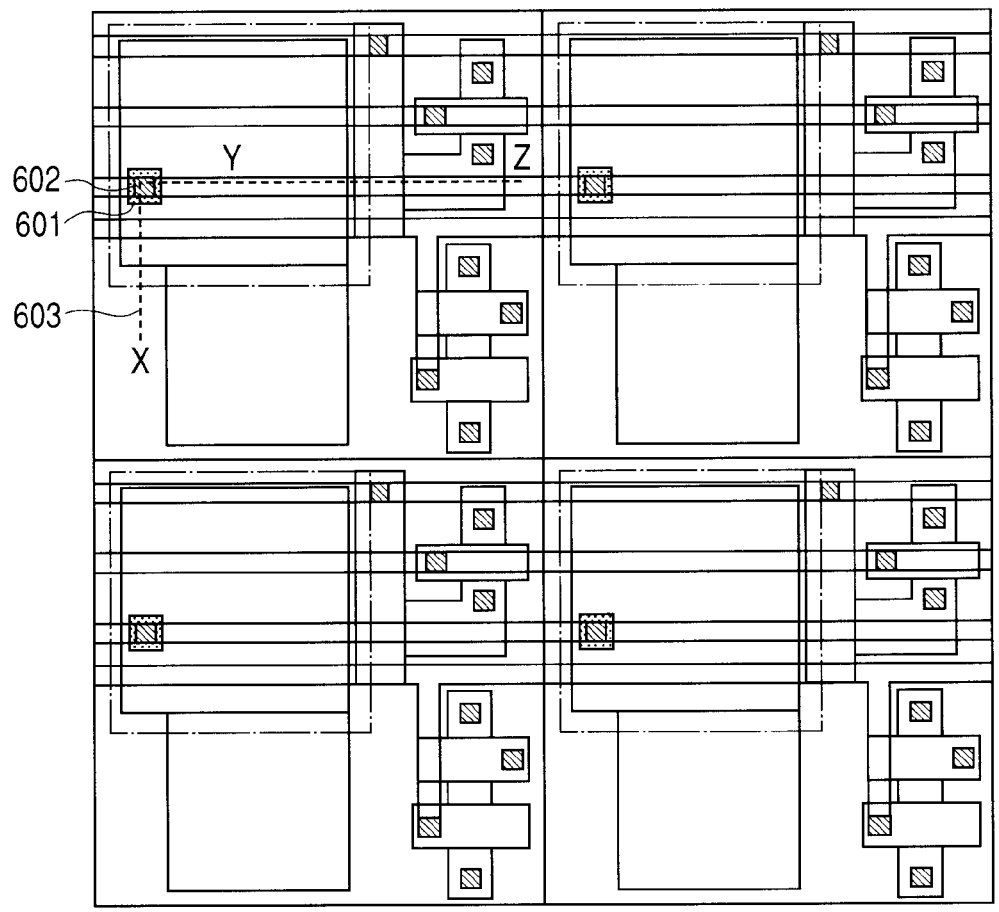
FIG. 7 is a top view of pixels in a solid-state imaging apparatus according to a third embodiment.

FIG. 7 is a top view of a solid-state imaging apparatus according to a third embodiment. A contact plug 601 for connecting a control electrode in a charge accumulating unit and a light shielding portion, and a contact plug 602 for connecting the light shielding portion and a wiring layer provided above the light shielding portion are arranged so that they planarly overlap.

Figure 8:
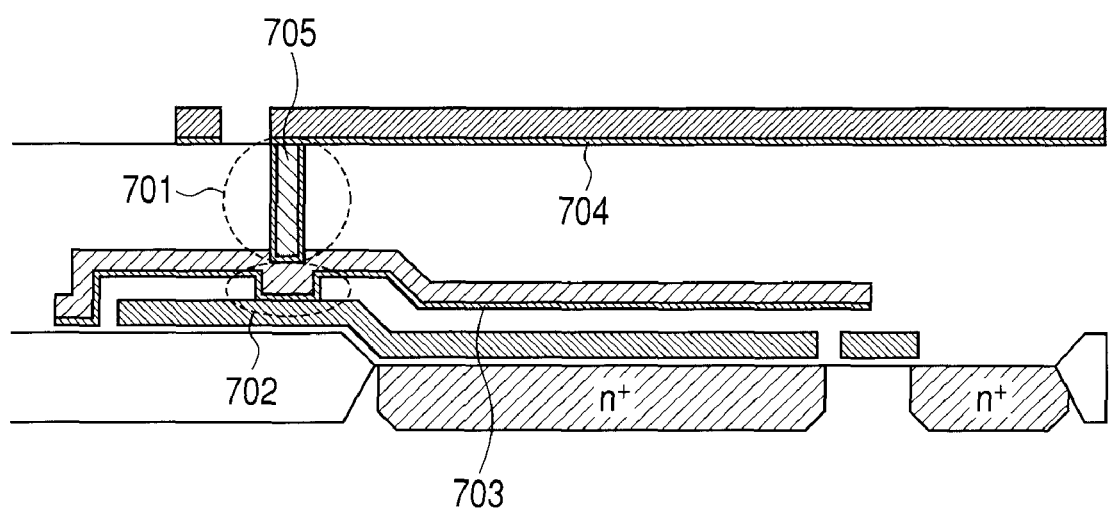
FIG. 8 is a cross-sectional view of a pixel in a solid-state imaging apparatus according to a third embodiment.

FIG. 8 is a cross-sectional view taken along an X-Y-Z line 603 in FIG. 7. A contact plug 701 is provided to electrically connect a wiring and the light shielding portion, and a contact plug 702 is provided to electrically connect the light shielding portion and the control electrode.

Barrier metals 703 and 704 are formed together with the respective contact plugs, and various high-melting point metals such as, for example, titanium nitride and tantalum, can be used. For a conductor with which a contact hole is filled to form a plug, tungsten or polysilicon can be used.

The present embodiment can prevent formation of a hole in the light shielding portion as a result of the light shielding portion being burst through during formation of a hole for the contact plug 701, and thus, can prevent lowering of the light shielding effect.

A hole for the contact plug 701 for electrically connecting the wiring and the light shielding portion is formed by means of etching with the same process as that for forming contact holes from the wiring to the substrate and from the wiring layer to the control electrode. The thickness from the wiring to the light shielding portion is smaller than the thickness from the wiring to the substrate and the thickness from the wiring to the control electrode, and thus, during etching, the light shielding portion may be burst through. Although various materials can be employed for the barrier metals, where e.g., titanium nitride is used, the light shielding effect is not relatively high, and thus, an aperture may be formed in a part of the light shielding portion during hole formation, resulting in light being guided through the barrier metal, lowering the light shielding effect. Like the present embodiment, the planar overlap between the contact plug from the wiring to the light shielding portion and the contact plug from the light shielding portion to the gate film enables suppression of over-etching during formation of a contact hole, and thus enables prevention of lowering of the light shielding effect.

Although the present invention has been described with reference to specific embodiments, the present invention is not limited to these embodiments, and modifications or the like can arbitrarily be made as far as such modifications or the like do not deviate from the spirit of the present invention. According to the present invention, at least the global exposure mode and the line exposure mode can selectively be employed for operation. This feature is especially effective for a configuration in which signal charges move from the photoelectric conversion units to the charge accumulating units during light entering the photoelectric conversion units. For a specific configuration example, where a charge transfer unit between the photoelectric conversion unit and the charge accumulating unit is an MOS transistor, this MOS transistor is a buried channel structure. In addition, the configuration has a portion in a position deeper than the surface in which the energy barrier is low only in the position, even in a non-conductive state. In this case, the charge transfer unit can be made in a state in which a fixed voltage is supplied thereto, without performing active control. In other words, a fixed potential barrier may be provided even if such potential barrier does not have a function as a transfer unit.

According to the configuration as described above, a majority of signal charges generated as a result of photoelectric conversion performed when light enters the photoelectric conversion unit can be transferred to the charge accumulating unit without being accumulated in the photoelectric conversion unit. Accordingly, the photoelectric conversion units included in all the pixels can accumulate charges at the same charge accumulation time. Also, while the MOS transistor is in a non-conductive state, holes are accumulated on the channel surface, and a channel through which charges are transferred exists at a position of a predetermined depth from the surface, and thus, the effect of dark current on the insulating film interface can be reduced.

From another viewpoint, while signal charges are being accumulated in the photoelectric conversion unit and the charge accumulating unit, the potential of the charge path between the photoelectric conversion unit and the charge accumulating unit can be considered as being lower than the potential of the charge path between the photoelectric conversion unit and the OFD region. The "potential" here means a potential for signal charges.

Furthermore, from the viewpoint of driving, charges moved from the photoelectric conversion unit to the first charge accumulating unit during one exposing period are accumulated in the first charge accumulating unit and used as image signals. In other words, after the start of one exposing period in the photoelectric conversion unit, signals can be considered as being read to the outside of the pixel without a reset operation of the charge accumulating unit. One exposing period is determined in common to the photoelectric conversion units for taking an image for one frame.

With such configuration, global exposure can relatively easily be performed; however, during transfer from the charge accumulating units to the FD regions, the charges in the photoelectric conversion units are discharged to the OFD regions, resulting in generation of an intermittent image. Where continuity of an image is particularly necessary in such configuration, a continuous image can be provided by performing a line exposure. The configuration enables both types of exposures to be switched from each other as necessary.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-222022, filed Aug. 29, 2008, which is hereby incorporated by reference herein in its entirety.

What is claimed is:
1. A solid-state imaging apparatus comprising:
 a plurality of pixels arranged along rows and columns on a substrate, wherein each of the pixels includes
 a photoelectric conversion unit,
 a semiconductor region,
 a control electrode disposed to sandwich an insulating film between the control electrode and the semiconductor region, a charge accumulating unit for accumulating in the semiconductor region signal charges generated in the photoelectric conversion unit, an amplifying unit, and a transfer unit having a transfer electrode for controlling an electrical continuity between the charge accumulating unit and an input portion of the amplifying unit, wherein the solid-state imaging apparatus further comprises:

a light shielding portion covering the charge accumulating unit, and a connecting unit for connecting electrically the control electrode to the light shielding portion, the light shielding portion of one of the pixels in one row is electrically connected to other light shielding portions of other pixels in the same one row and adjacent to the one pixel in the one row, and is electrically insulated from other light shielding portions of pixels in rows different from the one row.

2. The solid-state imaging apparatus according to claim 1, wherein the light shielding portions of the pixels in the one row are electrically connected through a wiring layer arranged on an upper portion of the light shielding portions.

3. The solid-state imaging apparatus according to claim 1, wherein the light shielding portion of the one pixel in the one row is directly connected to the other light shielding portions of the other pixels in the same one row and adjacent to the one pixel in the one row.

4. The solid-state imaging apparatus according to claim 1, wherein the solid-state imaging apparatus is selectable between a driving mode wherein a start and an end of an exposing period are set commonly to a whole imaging area, and a driving mode wherein a start and an end of an exposing period are set commonly to pixels in the same row.

* * * * *